US010990239B1

(12) United States Patent
Iwasa et al.

(10) Patent No.: US 10,990,239 B1
(45) Date of Patent: Apr. 27, 2021

(54) DISPLAY CONTROL APPARATUS, VEHICLE, AND DISPLAY CONTROL METHOD

(71) Applicant: HONDA MOTOR CO., LTD., Tokyo (JP)

(72) Inventors: Tatsuya Iwasa, Wako (JP); Andrew R. Hoover, Torrance, CA (US); Ross Cameron Miller, Torrance, CA (US); Mohit Kumar Agarwal, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/834,451

(22) Filed: Mar. 30, 2020

(51) Int. Cl.
*G06F 3/0481* (2013.01)
*G06F 3/0484* (2013.01)
*G09G 5/14* (2006.01)

(52) U.S. Cl.
CPC .......... *G06F 3/0481* (2013.01); *G06F 3/0484* (2013.01); *G09G 5/14* (2013.01); *G09G 2354/00* (2013.01); *G09G 2380/10* (2013.01)

(58) Field of Classification Search
CPC ...... G06F 3/041; G06F 3/0416; G06F 3/0482; G06F 3/04842; G06F 3/04847; G09G 2340/04; G09G 5/006
See application file for complete search history.

(56) References Cited

U.S. PATENT DOCUMENTS

| 6,374,102 B1* | 4/2002 | Brachman | H04W 76/00 |
| | | | 455/422.1 |
| 2017/0061669 A1* | 3/2017 | Hirano | B60K 37/00 |
| 2018/0239134 A1* | 8/2018 | Franz | G03B 21/208 |
| 2019/0261519 A1* | 8/2019 | Park | H04N 9/3188 |

FOREIGN PATENT DOCUMENTS

JP 2016-103171 A 6/2016

* cited by examiner

*Primary Examiner* — Maryam M Ipakchi
(74) *Attorney, Agent, or Firm* — Carrier Blackman & Associates, P.C.; Joseph P. Carrier; Jeffrey T. Godson (57) ABSTRACT

A display control apparatus includes one or more processors control display content in the display section, according to an interrupt request or a manipulation input, wherein the one or more processors display a first screen corresponding to the interrupt request in a first region in a display region of the display section when the interrupt request is received, and delete the first screen and display a second screen corresponding to a response to the interrupt request in a second region in the display region when the response is received by performing manipulation input to the first screen with the finger of the user, and a distance in a vehicle width direction between a driver's seat provided in a vehicle that includes the display section and the second region is greater than a distance in the vehicle width direction between the driver's seat and the first region.

8 Claims, 5 Drawing Sheets

DISPLAY CONTROL APPARATUS, VEHICLE, AND DISPLAY CONTROL METHOD

BACKGROUND OF THE INVENTION

Field of the Invention

The present invention relates to a display control apparatus, a vehicle, and a display control method.

Description of the Related Art

Japanese Laid-Open Patent Publication No. 2016-103171 discloses a manipulation reception system that, when an interrupt process is generated and manipulation of a user is not made on a first screen, displays an icon indicating that manipulation input by the user is being awaited on a second screen. Furthermore, Japanese Laid-Open Patent Publication No. 2016-103171 discloses receiving manipulation of a user on the first screen when an interrupt process is generated and manipulation by the user is performed on the first screen.

SUMMARY OF THE INVENTION

However, the manipulation receiving system disclosed in Japanese Laid-Open Patent Publication No. 2016-103171 is not always easy to use.

It is an object of the present invention to provide a display control apparatus, a vehicle, and a display control method that provide better usability.

A display control apparatus according to an aspect of the present invention includes one or more processors, wherein the one or more processors receive an interrupt request; receive manipulation input made by a finger of a user to a manipulation input section provided in a display region of a display section; and control display content in the display section, according to the interrupt request or the manipulation input, wherein the one or more processors display a first screen corresponding to the interrupt request in a first region in the display region when the interrupt request is received, and delete the first screen and display a second screen corresponding to a response to the interrupt request in a second region in the display region when the response is received by performing manipulation input to the first screen with the finger of the user, and a distance in a vehicle width direction between a driver's seat provided in a vehicle that includes the display section and the second region is greater than a distance in the vehicle width direction between the driver's seat and the first region.

A vehicle according to another aspect of the present invention includes the display control apparatus such as described above.

A display control method according to yet another aspect of the present invention includes displaying a first screen corresponding to an interrupt request in a first region in a display region of a display section when the interrupt request is received, and deleting the first screen and displaying a second screen corresponding to a response to the interrupt request in a second region in the display region when the response is received by performing manipulation input to the first screen with the finger of the user, wherein a distance in a vehicle width direction between a driver's seat provided in a vehicle that includes the display section and the second region is greater than a distance in the vehicle width direction between the driver's seat and the first region.

According to the present invention, it is possible to provide a display control apparatus, a vehicle, and a display control method that provide better usability.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The following describes in detail preferred embodiments of a display control apparatus, a vehicle, and a display control method according to the present invention, while referencing the accompanying drawings.

EMBODIMENTS

Figure 1:
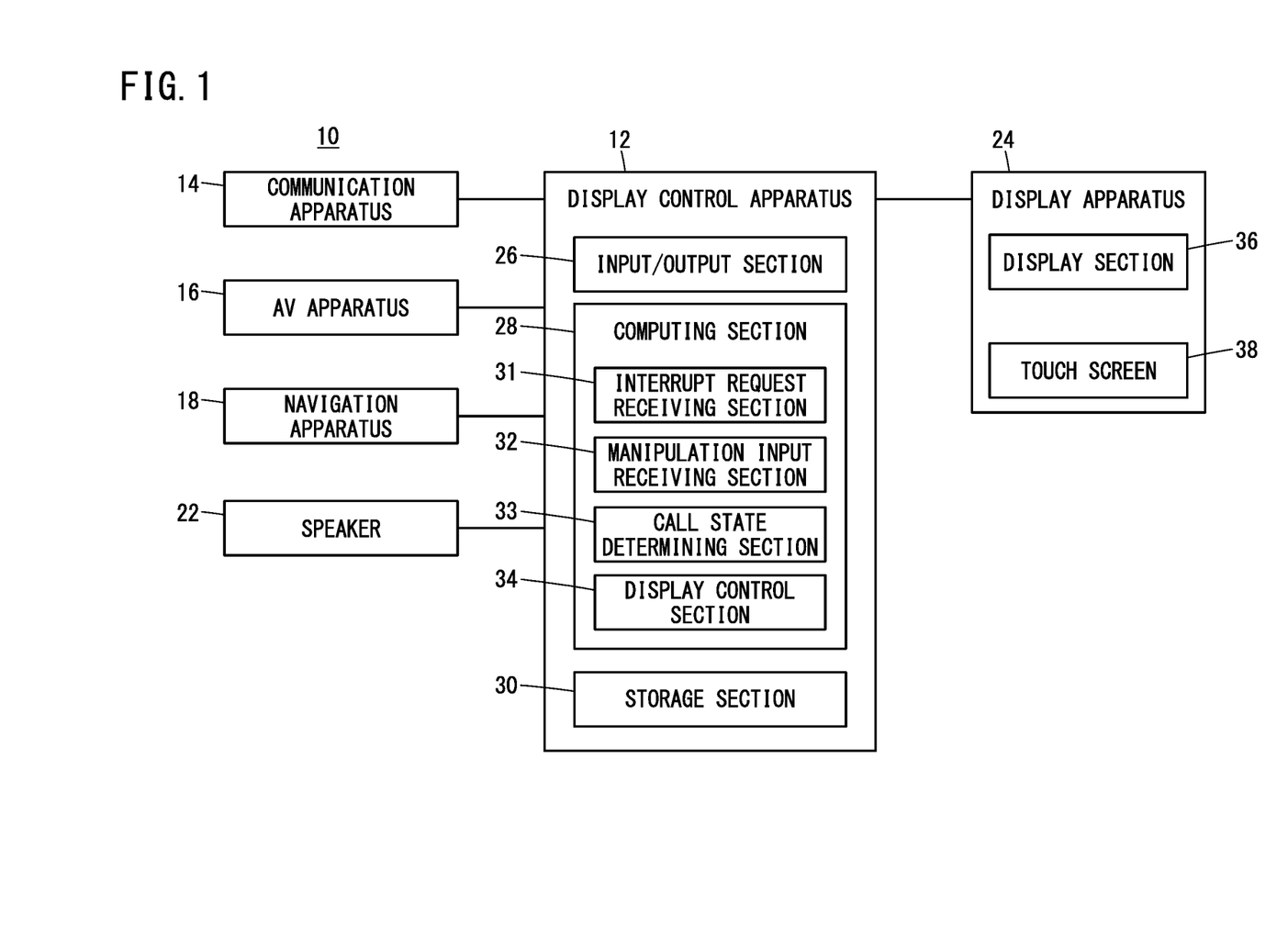
FIG. 1 is a block diagram showing a vehicle that includes a display control apparatus according to an embodiment.

The following describes a display control apparatus, a vehicle, and a display control method according to an embodiment, while referencing FIGS. 1 to 4. FIG. 1 is a block diagram showing a vehicle that includes the display control apparatus according to the present embodiment.

A vehicle (host vehicle) 10 includes a display control apparatus 12, that is, a display control ECU (Electronic Control Unit). The vehicle 10 further includes a communication apparatus 14, an AV (Audio Visual) apparatus 16, a navigation apparatus 18, a speaker 22, and a display apparatus 24. The vehicle 10 includes other configurational elements, but configurational elements other than those mentioned above are ignored in order to simplify the description.

The display control apparatus 12 includes an input/output section 26, a computing section 28, and a storage section 30. The input/output section 26 can include an interface (not shown in the drawings), a driver (not shown in the drawings), and the like.

The computing section 28 performs overall control of the display control apparatus 12. The computing section 28 can be formed by a processor such as a CPU (Central Processing Unit), for example. The computing section 28 includes an interrupt request receiving section 31, a manipulation input receiving section 32, a call state determining section 33, and a display control section 34. The interrupt request receiving section 31, the manipulation input receiving section 32, the call state determining section 33, and the display control section 34 can be realized by having the computing section 28 execute a program stored in the storage section 30.

The storage section 30 includes a volatile memory (not shown in the drawings) and a non-volatile memory (not shown in the drawings). The volatile memory is a RAM (Random Access Memory) or the like, for example. The non-volatile memory is a ROM (Read Only Memory), a flash memory, or the like, for example. Programs, tables, and the like can be stored in the non-volatile memory, for example.

The communication apparatus 14 can perform wireless communication with another communication apparatus (not shown in the drawings). The communication apparatus 14 includes a communication circuit, an antenna, and the like. The communication apparatus 14 can perform cellular communication with another communication apparatus, for example, but is not limited to this. The communication apparatus 14 can perform wireless communication with another communication apparatus, via a network (not shown in the drawings), for example. The network is the Internet or the like, for example, but is not limited to this. Furthermore, the communication apparatus 14 can perform short-range wireless communication. The wireless communication is short-range communication or the like based on the Bluetooth (Registered Trademark) standard, for example, but is not limited to this. The communication apparatus 14 may be capable or incapable of being attached to and detached from the vehicle 10. The communication apparatus 14 that is capable of being attached to and detached from the vehicle 10 is a mobile telephone, a smartphone, or the like, for example, but is not limited to this.

The AV apparatus 16 can provide a user with audiovisual content. Specifically, the AV apparatus 16 can output sound via the speaker 22. The AV apparatus 16 can display a video in a display region 37 of a display section 36, which is described further below. The audiovisual content can be stored in advance in a storage medium (not shown in the drawings) included in the AV apparatus 16, for example, but is not limited to this. This storage medium is a CD (Compact Disc), a DVD (Digital Versatile Disc), an HDD (Hard Disk Drive), or the like, for example, but is not limited to this. The AV apparatus 16 includes a radio broadcast receiving section (not shown in the drawings). The AV apparatus 16 can provide the user with a radio broadcast received by the radio broadcast receiving section, via the speaker 22.

The navigation apparatus 18 includes a GNSS (Global Navigation Satellite System) sensor (not shown in the drawings). The navigation apparatus 18 further includes a computing section (not shown in the drawings) and a storage section (not shown in the drawings). The GNSS sensor can detect the current position of the vehicle 10. The computing section reads map information corresponding to the current position detected by the GNSS sensor, from a map database stored in the storage section. The computing section can determine a target route from the current position to a destination, using this map information. The navigation apparatus 18 can supply the display control apparatus 12 with the position information of the vehicle 10, the route information, the map information, and the like.

Figure 2:
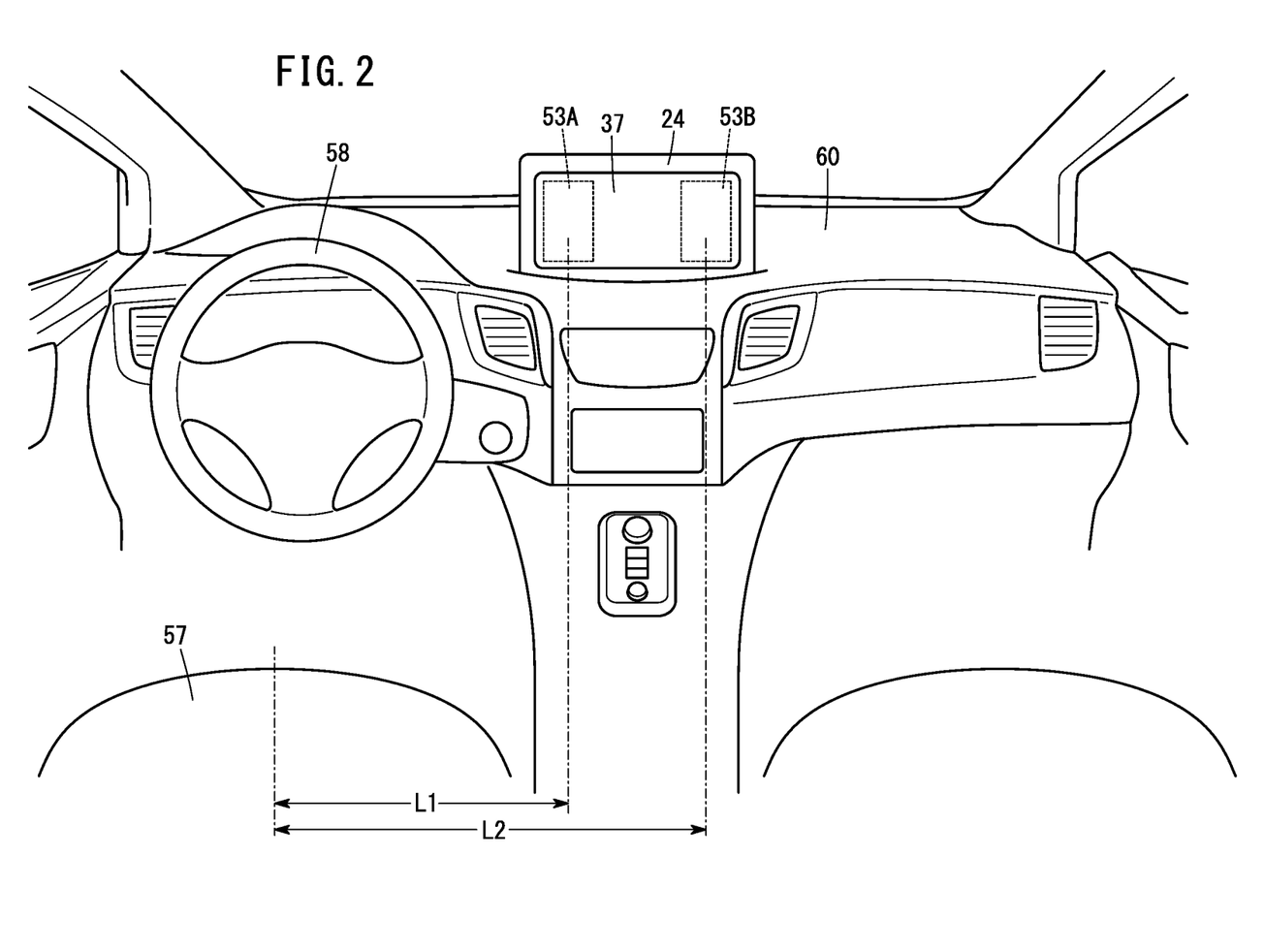
FIG. 2 shows a portion of the vehicle that includes the display control apparatus according to the embodiment.

The display apparatus 24 includes the display section (display) 36 and a touch screen (touch panel) 38. FIG. 2 shows a portion of a vehicle according to the present embodiment. Here, an example is described of a case in which a driver's seat 57 is located on the left side in the vehicle 10, but the present invention is not limited to this. As shown in FIG. 2, the display apparatus 24 is positioned at the center in the vehicle width direction. A steering wheel 58 is provided to the driver's seat 57. The display apparatus 24 is arranged in a top portion of an instrument panel 60, but is not limited to this. The image information supplied from the display control apparatus 12 can be displayed in the display region 37 of the display section 36. The display section 36 is a liquid crystal display, an organic EL display, or the like, for example, but is not limited to this. The display apparatus 24 may be a flat type or a curved type.

The touch screen 38, which is a manipulation input section, is arranged on the display section 36. In other words, the touch screen 38 is included in the display region 37 of the display section 36. The touch screen 38 includes a manipulation input screen (sensor screen) where manipulation is input by a finger 43 of the user (see FIG. 4A). The manipulation input screen is a flat board. The manipulation input screen is positioned on the display region 37 of the display section 36. The manipulation input screen is formed of a transparent material. The touch screen 38 can detect manipulation made to the manipulation input screen, and can supply the display control apparatus 12 with manipulation information indicating the detected manipulation. More specifically, the touch screen 38 detects touching of the manipulation input screen by the finger 43 of the user, acquires touch coordinates that are the coordinates where the finger 43 touched the manipulation input screen and changes in these coordinates, and supplies the display control apparatus 12 with the acquired touch coordinates and changes thereof as the manipulation information. The detection technique of the touch screen 38 may be an electrostatic technique, or may be a pressure sensing technique.

The interrupt request receiving section 31 can receive the interrupt request. This interrupt request is reception of an incoming call, for example, but is not limited to this. The call can be made between the communication apparatus 14 and an external communication apparatus. During the reception of the call, the communication apparatus 14 supplies the display control apparatus 12 with information indicating this fact.

The manipulation input receiving section 32 can receive manipulation input made to the touch screen 38 by the finger 43 of the user.

The call state determining section 33 can determine whether a call is in progress. As described above, the call can be made between the communication apparatus 14 and an external communication apparatus. Information indicating a call state can be supplied to the display control apparatus 12 from the communication apparatus 14. The call state determining section 33 can determine whether a call is being made between the communication apparatus 14 and the external communication apparatus.

The display control section 34 can control the display content in the display section 36 according to the interrupt request received by the interrupt request receiving section 31. Furthermore, the display control section 34 can control the display content in the display section 36 according to the manipulation input received by the manipulation input receiving section 32. When the interrupt request is received by the interrupt request receiving section 31, the display control section 34 can display a first screen (interrupt screen or incoming call screen) 54A (see FIG. 3A) corresponding to this interrupt request in a first region 53A in the display region 37 of the display section 36. The first region 53A is a region relatively near the driver's seat 57 in the display region 37 of the display section 36. In order to make it possible to easily check the current position of the vehicle 10 in a map screen 44, the location corresponding to the center of the map screen 44, i.e., the current position in the map screen 44, is preferably not hidden by the first screen 54A. Therefore, the first region 53A can be set so as not to overlap with the center of the map screen 44. When a response manipulation made in response to the interrupt request is received by the manipulation input receiving section 32, the display control section 34 deletes the first screen 54A and displays a second screen (response screen or call-in-progress screen) 54B in a second region 53B in the display region 37 of the display section 36. In other words, the display control section 34 switches the first screen 54A to the second screen 54B, and displays this second screen 54B in the second region 53B. The second region 53B is a region that is relatively far from the driver's seat 57 in the display region 37. The driver's seat 57 is positioned on one side relative to the center of the vehicle 10 in the vehicle width direction. The first region 53A is positioned on one side relative to the center of the vehicle 10 in the vehicle width direction. The second region 53B is positioned on the other side relative to the center of the vehicle 10 in the vehicle width direction. The response manipulation made in response to the interrupt request can be performed by touching a portion of the first screen 54A with the finger 43 of the user. More specifically, the response manipulation made in response to the interrupt request can be performed by touching the manipulation button 50B, described further below, displayed in the first screen 54A with the finger 43 of the user. A distance L2 in the vehicle width direction between the driver's seat 57 and the second region 53B is greater than a distance L1 in the vehicle width direction between the driver's seat 57 and the first region 53A.

Figure 3A:
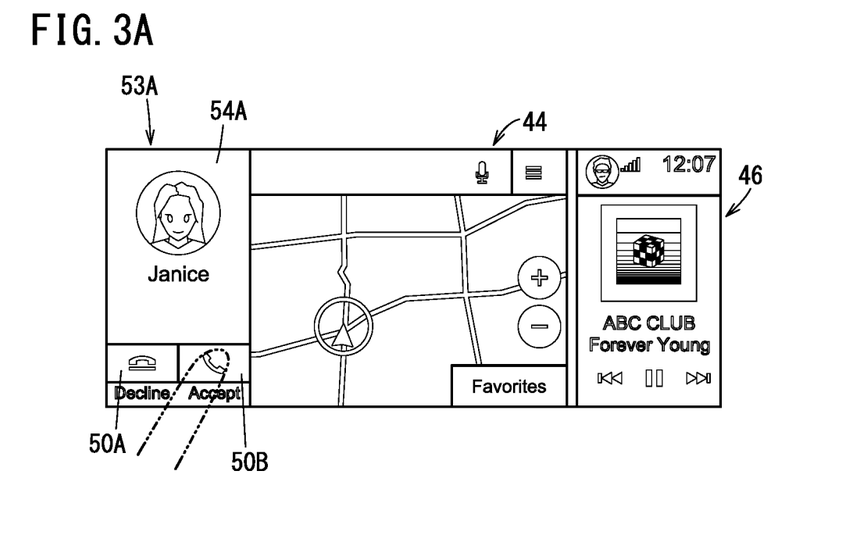
FIGS. 3A and 3B show examples of a display screen.
Figure 3B:
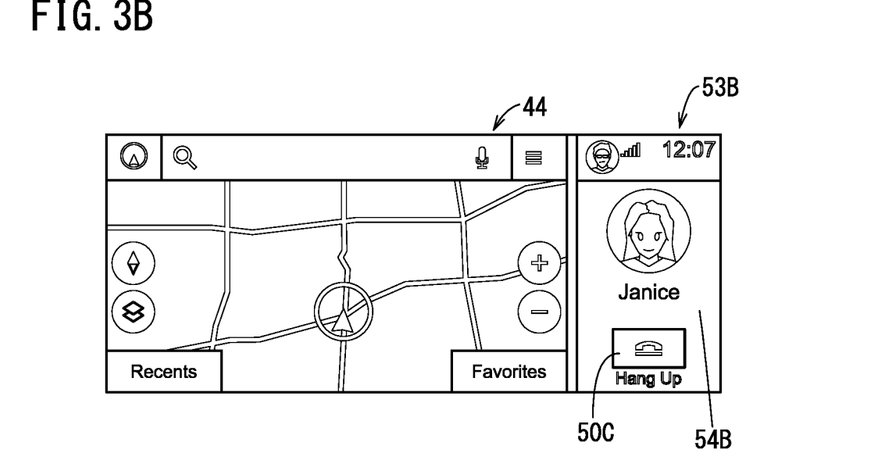

FIGS. 3A and 3B show examples of a display screen. FIG. 3A shows an example of a display when an interrupt request is received. FIG. 3B shows an example of a display when a manipulation response has been made in response to the interrupt request.

As shown in FIG. 3A, the map screen 44, a music playback screen 46, and the first screen 54A, for example, can be displayed in the display region 37 of the display section 36. The music playback screen 46 can be displayed on the right side, for example, in the map screen 44, but is not limited to this. The first screen 54A can be displayed in the first region 53A in the display region 37 of the display section 36, as described above. The first region 53A is a region that is relatively close to the driver's seat 57 in the display region 37 of the display section 36, as described above. The first region 53A overlaps with a portion of the map screen 44, for example. Accordingly, when the first screen 54A is displayed in the first region 53A, a portion of the map screen 44 can be hidden by the first screen 54A. The manipulation buttons 50A and 50B, which are icons, are included in the first screen 54A, as described above. The reference numeral 50 is used when describing a manipulation button in general, and the reference numerals 50A and 50B are used when describing the individual manipulation buttons. The manipulation button 50A is a manipulation button for declining the call, i.e., a decline button. The manipulation button 50B is a manipulation button for accepting the call, i.e., an accept button.

When the manipulation button 50A, i.e., the decline button, is selected while the first screen 54A such as shown in FIG. 3A is being displayed in the display region 37 of the display section 36, the following occurs. That is, information indicating that the manipulation button 50A has been selected is supplied from the touch screen 38 to the display control section 34 and the communication apparatus 14. When the information indicating that the manipulation button 50A has been selected is supplied to the display control section 34, the display control section 34 deletes the first screen 54A. Furthermore, when the information indicating that this manipulation button 50A has been selected is supplied to the communication apparatus 14, the communication apparatus 14 performs a process to decline the call from the external communication apparatus. The selection of the manipulation button 50A can be performed by tapping or the like the manipulation button 50A with the finger 43 of the user. Here, an example is described of a case in which the call is declined by manipulating the manipulation button 50A, but the present invention is not limited to this. The call may be declined by manipulating a button (not shown in the drawings) provided on the steering wheel 58.

When the manipulation button 50B is selected while the first screen 54A such as shown in FIG. 3A is being displayed in the display region 37 of the display section 36, the following occurs. That is, information indicating that the manipulation button 50B has been selected is supplied from the touch screen 38 to the display control section 34 and the communication apparatus 14. When the information indicating that the manipulation button 50B has been selected is supplied to the display control section 34, the display control section 34 transitions from the display screen such as shown in FIG. 3A to a manipulation screen such as shown in FIG. 3B. That is, the display control section 34 deletes the first screen 54A and displays the second screen 54B in the second region 53B in the display region 37 of the display section 36. The second region 53B is a different region than the region in which the map screen 44 is displayed, for example. When the second screen 54B is displayed in the second region 53B, a portion of the map screen 44 is not hidden by the second screen 54B. Furthermore, when the information indicating that the manipulation button 50B has been selected is supplied to the communication apparatus 14, the communication apparatus 14 performs a process to accept the call. A manipulation button 50C is provided in the second screen 54B. The manipulation button 50C is a manipulation button for cancelling the call. The manipulation button 50B (see FIG. 3A) for accepting the call is not provided in the second screen 54B. Here, an example is described in which the process for accepting the call is performed by manipulating the manipulation button 50B, but the present invention is not limited to this. The process for accepting the call may be performed by manipulating a button (not shown in the drawings) provided on the steering wheel 58.

When the manipulation button 50C is selected while the second screen 54B such as shown in FIG. 3B is being displayed in the display region 37 of the display section 36, the following occurs. That is, information indicating that this manipulation button 50C has been selected is supplied from the touch screen 38 to the display control section 34 and the communication apparatus 14. When the information indicating that the manipulation button 50C has been selected is supplied to the display control section 34, the display control section 34 deletes the second screen 54B. Furthermore, when the information indicating that the manipulation button 50C has been selected is supplied to the communication apparatus 14, the communication apparatus 14 performs the process to cancel the call. In a case where the caller has cancelled the telephone call without the user having selected the manipulation button 50C displayed in the second screen 54B, the call is ended. In a case where the call is ended due to the caller cancelling the telephone call as well, the display control section 34 deletes the second screen 54B. After the second screen 54B has been deleted due to the call having ended, the map screen 44 and the music playback screen 46 can each be displayed in the display region 37 of the display section 36. That is, the map screen 44 continues to be displayed and the second screen 54B is switched to the music playback screen 46. Here, an example is described of a case in which the process for ending the call is performed by manipulating the manipulation button 50C, but the present invention is not limited to this. The process for ending the call may be performed by manipulating a button (not shown in the drawings) provided on the steering wheel 58.

In the present embodiment, the first screen 54A is displayed in the first region 53A relatively near the driver's seat 57 because the user needs to make the input manipulation on the first screen 54A. That is, if the user does not select the manipulation buttons 50A and 50B, it is possible to continue attempting a call as long as the caller does not perform a manipulation to cancel the call. Furthermore, the call cannot be started if the user does not select the manipulation button 50B.

On the other hand, in the present embodiment, the second screen 54B is displayed in the second region 53B, which is relatively far from the driver's seat 57, for the following reasons. That is, it is not always necessary for the user to perform manipulation input to the second screen 54B, and therefore no significant problems will be caused by having the second screen 54B displayed in the second region 53B that is relatively far from the driver's seat 57. That is, it is possible to end the call if the caller cancels the telephone call, even if the user has not selected the manipulation button 50C displayed in the second screen 54B.

In the example shown in FIG. 3A, the screen displayed in the second region 53B is the music playback screen 46, and as long as the second screen 54B is displayed in this second region 53B, the map screen 44 is not hidden by the second screen 54B. Therefore, from the viewpoint of having the user drive the vehicle 10 while checking the map screen 44, it is preferable that the map screen 44 not be hidden by the second screen 54B.

Due to such reasons, in the present embodiment, the region in which the first screen 54A is displayed is the first region 53A that is relatively near the driver's seat 57, and the region in which the second screen 54B is displayed is the second region 53B that is relatively far from the driver's seat 57.

Figure 4:
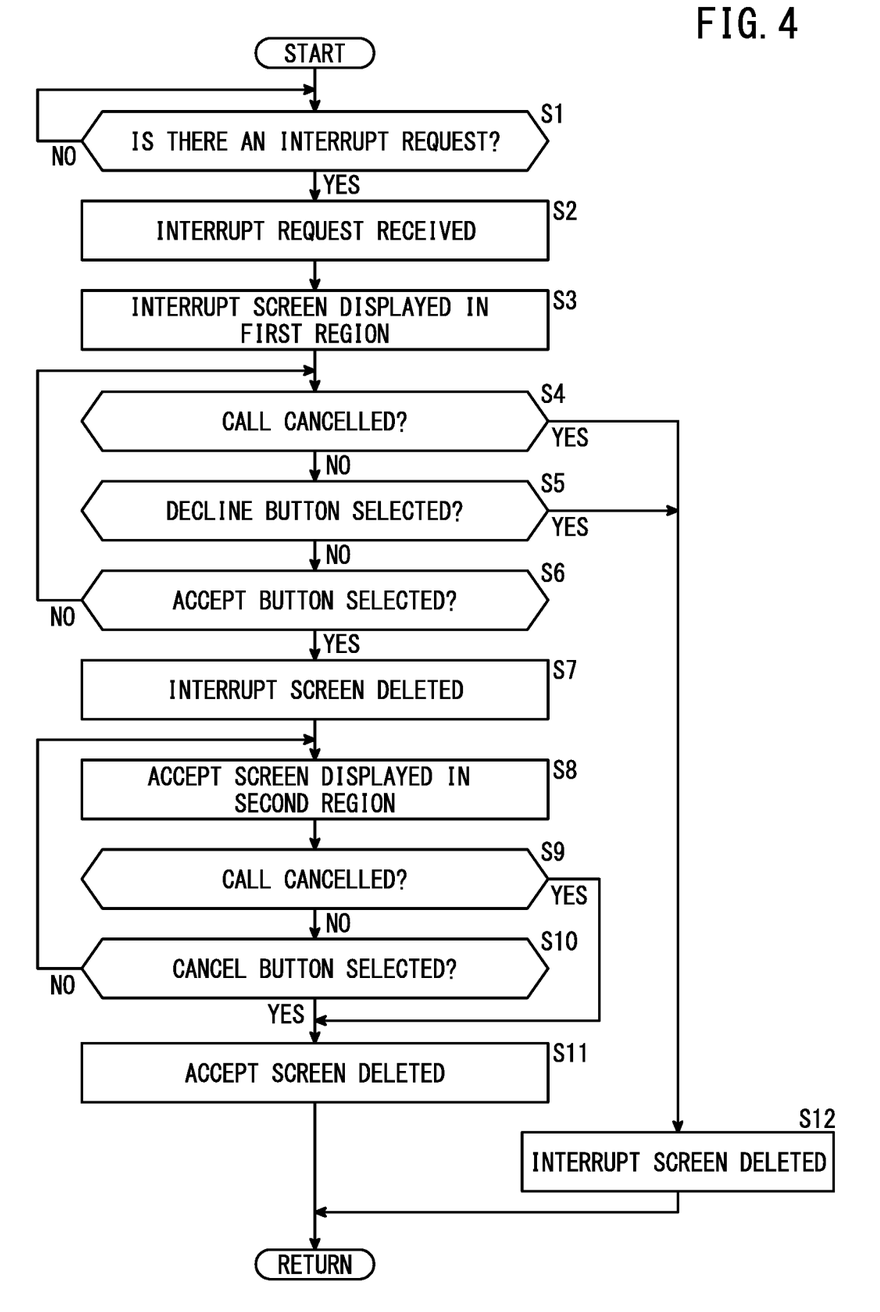
FIG. 4 is a flow chart showing an example of an operation of the display control apparatus according to the embodiment.

The following describes an example of an operation of the display control apparatus 12 according to the present embodiment, using FIG. 4. FIG. 4 is a flow chart showing an example of an operation of the display control apparatus according to the present embodiment.

At step S1, the interrupt request receiving section 31 determines whether there is an interrupt request. If there is an interrupt request (YES at step S1), the process moves to step S2. If there is no interrupt request (NO at step S1), the process at step S1 will be repeated.

At step S2, the interrupt request receiving section 31 receives the interrupt request. After this, the process moves to step S3.

At step S3, the display control section 34 displays the first screen 54A in the first region 53A in the display region 37 of the display section 36. After this, the process moves to step S4.

At step S4, the call state determining section 33 determines whether the call between the communication apparatus 14 and the external communication apparatus has been cancelled. If the call has been cancelled (YES at step S4), the process moves to step S12. If the call has not been cancelled (NO at step S4), the process moves to step S5.

At step S5, the manipulation input receiving section 32 determines whether the manipulation button 50A, i.e., the decline button), has been selected. If the manipulation button 50A, i.e., the decline button, has been selected (YES at step S5), the process moves to step S12. If the manipulation button 50A, i.e., the decline button, has not been selected (NO at step S5), the process moves to step S6.

At step S6, the manipulation input receiving section 32 determines whether the manipulation button 50B, i.e., the accept button, has been selected. If the manipulation button 50B, i.e., the accept button, has been selected (YES at step S6), the process moves to step S7. If the manipulation button 50B, i.e., the accept button, has not been selected (NO at step S6), the processes from step S4 are repeated.

At step S7, the display control section 34 deletes the first screen 54A. After this, the process moves to step S9.

At step S8, the display control section 34 displays the second screen 54B in the second region 53B in the display region 37 of the display section 36. After this, the process moves to step S9.

At step S9, the call state determining section 33 determines whether the call between the communication apparatus 14 and the external communication apparatus has been cancelled. If the call has been cancelled (YES at step S9), the process moves to step S11. If the call has not been cancelled (NO at step S9), the process moves to step S10.

At step S10, the manipulation input receiving section 32 determines whether the manipulation button 50C, i.e., the cancel button, has been selected. If the manipulation button 50C, i.e., the cancel button, has been selected (YES at step S10), the process moves to step S11. If the manipulation button 50C, i.e., the cancel button, has not been selected (NO at step S10), the processes from step S8 are repeated.

At step S11, the display control section 34 deletes the second screen 54B.

At step S12, the display control section 34 deletes the first screen 54A. In this way, the process shown in FIG. 4 is completed.

In this way, according to the present embodiment, when the interrupt request has been received by the interrupt request receiving section 31, the first screen 54A is displayed in the first region 53A that is relatively close to the driver's seat 57 in the display region 37 of the display section 36. Since the first screen 54A is displayed in the first region 53A that is relatively near the driver's seat 57, it is easy for the user to manipulate this first screen 54A. When the response manipulation made in response to the interrupt request is received by the manipulation input receiving section 32, the first screen 54A is deleted and the second screen 54B is displayed in the second region 53B that is relatively far from the driver's seat 57 in the display region 37. The second region 53B is a region in which the music playback screen 46 is displayed, for example, and a portion of the map screen 44, for example, is not hidden by the second screen 54B even when the second screen 54B is displayed in the second region 53B. In this way, according to the present embodiment, it is possible to improve the usability.

[Modifications]

While the preferred embodiments of the present invention have been described above, the technical scope of the invention is not limited to the above described embodiments, and various alterations and improvements can be added to the above-described embodiments without deviating from the scope of the present invention.

Figure 5A:
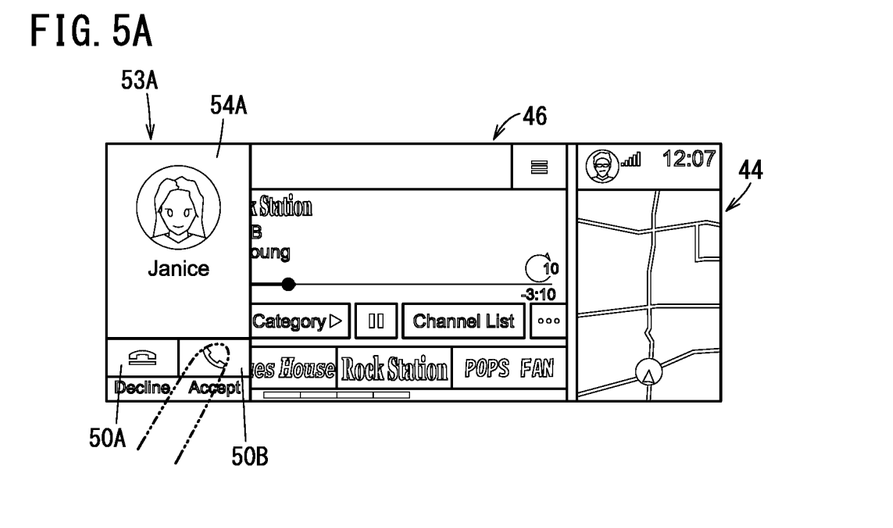
FIGS. 5A and 5B show examples of display screens according to modifications.
Figure 5B:
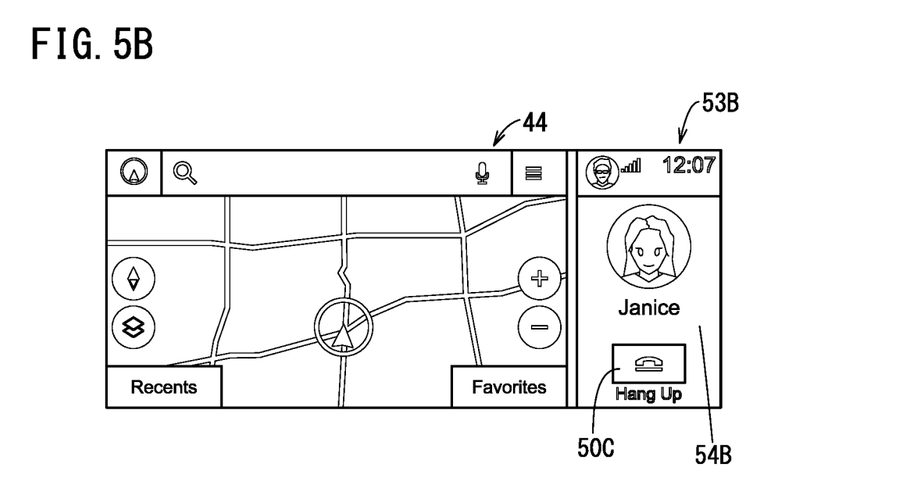

As an example, FIGS. 3A and 3B are used to describe an example of a case in which the map screen 44 is displayed near the driver's seat 57 and the music playback screen 46 is displayed far from the driver's seat 57, but the present invention is not limited to this. FIGS. 5A and 5B show an example of display screens according to a modification. FIG. 5A shows an example of a display when the interrupt request is received. FIG. 5B shows an example of a display when the response manipulation is made in response to the interrupt request. When the manipulation button 50B is manipulated while the music playback screen 46 is being displayed near the driver's seat 57, the map screen 44 may be displayed near the driver's seat 57 and the second screen 54B may be displayed far from the driver's seat 57, as shown in FIG. 5B. In this way, the music playback screen 46 and the second screen 54B that both involve audio output are prevented from being displayed simultaneously in the display region 37 of the display section 36.

The following is a summary of the embodiments described above.

The display control apparatus (12) includes the one or more processors (31, 32, 34), wherein the one or more processors (31, 32, 34) receive the interrupt request; receive manipulation input made by the finger (43) of the user to a manipulation input section provided in the display region of the display section; and control display content in the display section, according to the interrupt request or the manipulation input, and wherein the one or more processors (34) display the first screen (54A) corresponding to the interrupt request in the first region (53A) in the display region when the interrupt request is received, and delete the first screen and display the second screen (54B) corresponding to the response to the interrupt request in the second region (53B) in the display region when the response is received by performing manipulation input to the first screen with the finger of the user, and the distance (L2) in the vehicle width direction between the driver's seat (57) provided in the vehicle (10) that includes the display section and the second region is greater than the distance (L1) in the vehicle width direction between the driver's seat and the first region. According to such a configuration, since the first screen is displayed relatively near the driver's seat, the user, i.e., the driver, can provide manipulation input to the first screen relatively easily. Therefore, according to such a configuration, it is possible to improve the usability.

The interrupt request may be an incoming call, the first screen may be an incoming call screen, and the second screen may be a call-in-progress screen.

The first screen may include the manipulation button (50B) for accepting the call and the manipulation button (50A) for declining the call, and the second screen may include the manipulation button (50C) for cancelling the call, but does not include the manipulation button (50B) for accepting the call.

The driver's seat may be positioned on one side relative to the center of the vehicle in the vehicle width direction, and the second region may be positioned on the other side relative to the center of the vehicle in the vehicle width direction.

When the first screen is displayed in the first region, at least a portion of the map screen (44) displayed in the display region may be hidden by the first screen.

The second region may be a different region than a region where the map screen is displayed. According to such a configuration, it is possible to improve the usability since the map screen is not hidden by the second screen.

A vehicle includes the display control apparatus such as described above.

The display control method includes displaying (S2, S3) the first screen corresponding to the interrupt request in the first region in the display region of the display section when the interrupt request is received, and deleting (S6 to S8) the first screen and displaying the second screen corresponding to the response to the interrupt request in the second region in the display region when the response is received by performing manipulation input to the first screen with the finger of the user, wherein the distance in the vehicle width direction between the driver's seat provided in the vehicle that includes the display section and the second region is greater than the distance in the vehicle width direction between the driver's seat and the first region.

What is claimed is:

1. A display control apparatus comprising one or more processors, wherein the one or more processors:
   receive an interrupt request;
   receive manipulation input made by a finger of a user to a manipulation input section provided in a display region of a display section; and
   control display content in the display section, according to the interrupt request or the manipulation input, and
   wherein the one or more processors display a first screen corresponding to the interrupt request in a first region in the display region when the interrupt request is received, and delete the first screen and display a second screen corresponding to a response to the interrupt request in a second region that does not overlap with the first region in the display region when the response is received by performing manipulation input to the first screen with the finger of the user, and
   a distance in a vehicle width direction between a driver's seat provided in a vehicle that includes the display section and the second region is greater than a distance in the vehicle width direction between the driver's seat and the first region,
   the interrupt request is an incoming call,
   the incoming call is made between a communication apparatus provided in the vehicle and an external communication apparatus,
   the first screen includes a manipulation button for accepting the incoming call, and
   the response is received by a touching of the manipulation button for accepting the incoming call.

2. The display control apparatus according to claim 1, wherein
   the first screen is an incoming call screen, and
   the second screen is a call-in-progress screen.

3. The display control apparatus according to claim 2, wherein
   the first screen further includes a manipulation button for declining the call, and
   the second screen includes a manipulation button for cancelling the call, but does not include the manipulation button for accepting the call.

4. The display apparatus according to claim 1, wherein
   the driver's seat is positioned on one side relative to a center of the vehicle in the vehicle width direction, and
   the second region is positioned on another side relative to the center of the vehicle in the vehicle width direction.

5. The display control apparatus according to claim 1, wherein
   when the first screen is displayed in the first region, at least a portion of a map screen displayed in the display region is hidden by the first screen.

6. The display control apparatus according to claim 5, wherein
   the second region is a different region than a region where the map screen is displayed.

7. A vehicle comprising a display control apparatus, the display control apparatus including one or more processors, wherein the one or more processors:
   receive an interrupt request;
   receive manipulation input made by a finger of a user to a manipulation input section provided in a display region of a display section; and control display content in the display section, according to the interrupt request or the manipulation input, and wherein the one or more processors display a first screen corresponding to the interrupt request in a first region in the display region when the interrupt request is received, and delete the first screen and display a second screen corresponding to a response to the interrupt request in a second region that does not overlap with the first region in the display region when the response is received by performing manipulation input to the first screen with the finger of the user, and a distance in a vehicle width direction between a driver's seat provided in a vehicle that includes the display section and the second region is greater than a distance in the vehicle width direction between the driver's seat and the first region, the interrupt request is an incoming call, the incoming call is made between a communication apparatus provided in the vehicle and an external communication apparatus, the first screen includes a manipulation button for accepting the incoming call, and the response is received by a touching of the manipulation button for accepting the incoming call.

8. A display control method comprising:

displaying a first screen corresponding to an interrupt request in a first region in a display region of a display section when the interrupt request is received, and deleting the first screen and displaying a second screen corresponding to a response to the interrupt request in a second region that does not overlap with the first region in the display region when the response is received by performing manipulation input to the first screen with the finger of the user, wherein a distance in a vehicle width direction between a driver's seat provided in a vehicle that includes the display section and the second region is greater than a distance in the vehicle width direction between the driver's seat and the first region, the interrupt request is an incoming call, the incoming call is made between a communication apparatus provided in the vehicle and an external communication apparatus, the first screen includes a manipulation button for accepting the incoming call, and the response is received by a touching of the manipulation button for accepting the incoming call.

\* \* \* \* \*